United States Patent
Jandric et al.

(10) Patent No.: US 11,150,410 B2
(45) Date of Patent: Oct. 19, 2021

(54) MOVABLE OPTICAL SWITCHING MEDIUM

(71) Applicant: Seagate Technology LLC, Cupertino, CA (US)

(72) Inventors: Zoran Jandric, St. Louis Park, MN (US); Kevin A. Gomez, Eden Prairie, MN (US); Dan Mohr, Roseville, MN (US); Anil J. Reddy, Minneapolis, MN (US); Aditya Jain, Minneapolis, MN (US); Krishnan Subramanian, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/513,455

(22) Filed: Jul. 16, 2019

(65) Prior Publication Data

US 2021/0018691 A1  Jan. 21, 2021

(51) Int. Cl.
*G02B 6/35* (2006.01)

(52) U.S. Cl.
CPC ......... *G02B 6/3536* (2013.01); *G02B 6/3504* (2013.01); *G02B 6/356* (2013.01)

(58) Field of Classification Search
CPC ..... G02B 6/3536; G02B 6/3504; G02B 6/356
See application file for complete search history.

(56) References Cited

U.S. PATENT DOCUMENTS

| | | | | |
|---|---|---|---|---|
| 4,013,000 A | * | 3/1977 | Kogelnik | G02B 6/2821 385/17 |
| 4,378,144 A | | 3/1983 | Duck et al. | |
| 5,115,481 A | | 5/1992 | Buhrer | |
| 5,835,458 A | * | 11/1998 | Bischel | G11B 7/122 369/44.12 |
| 6,144,449 A | * | 11/2000 | Knuettel | G01N 21/4795 356/450 |
| 6,404,943 B1 | * | 6/2002 | Wang | G02B 6/29317 385/22 |
| 6,925,224 B2 | * | 8/2005 | Ellis | G02B 6/3506 310/40 MM |
| 8,675,199 B2 | * | 3/2014 | Duer | G02B 6/4226 356/432 |
| 8,988,754 B2 | * | 3/2015 | Sun | G02B 6/26 359/238 |

FOREIGN PATENT DOCUMENTS

WO  WO 2018/053527 A1  3/2018

OTHER PUBLICATIONS

Ma et al., "Ultralow loss single layer submicron silicon waveguide crossing for SOI optical interconnect", Nov. 20, 2013, *Optics Express*, 21(24):29374-29382.

(Continued)

*Primary Examiner* — Ryan A Lepisto
(74) *Attorney, Agent, or Firm* — Mueting Raasch Group

(57) ABSTRACT

Systems, devices, and methods may use input/output (I/O) apparatus and an optical switching medium to switch, or route, optical data signals. The optical switching medium may include a plurality of optical switching regions. The I/O apparatus may transmit optical data signals to and receive optical data signals from the optical switching medium to provide switching functionality.

26 Claims, 8 Drawing Sheets

(56) References Cited

OTHER PUBLICATIONS

Mellette et al., "A Scalable, Partially Configurable Optical Switch for Data Center Networks", Jan. 15, 2017, *Journal of Lightwave Technology*, 35(2):136-144.

Mellette et al., "RotorNet: A Scalable, Low-complexity, Optical Datacenter Network", *Proceedings of SIGCOMM '17*, SIGCOMM Aug. 21-25, 2017, Los Angeles, California, 14 pages. Available online at <http://cseweb.ucsd.edu/~gmporter/papers/sigcomm17-rotornet.pdf. Retrieved from the internet Jan. 31, 2019.

\* cited by examiner

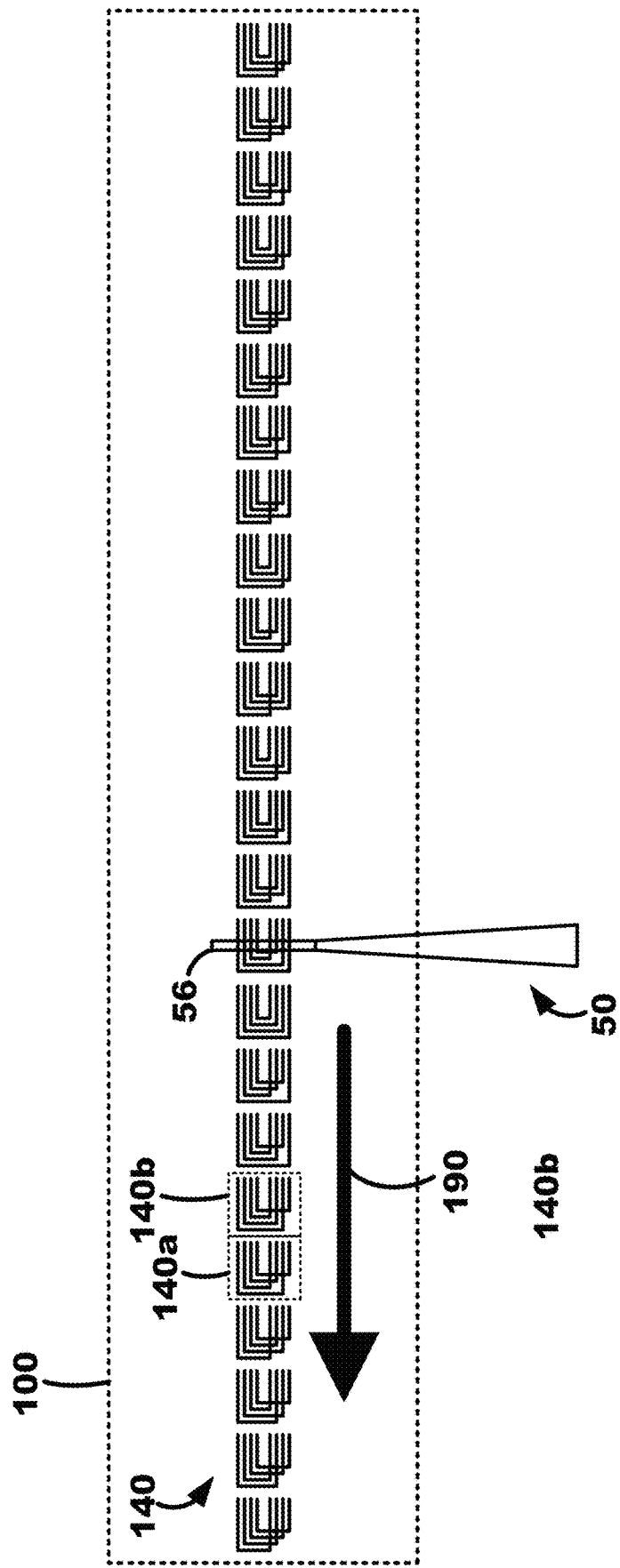

MOVABLE OPTICAL SWITCHING MEDIUM

The disclosure herein relates to systems, devices, and apparatus to provide optical switching using a moveable optical switching medium.

SUMMARY

Illustrative systems, devices, and apparatus described herein may include and use an optical switching medium. The optical switching medium may include a plurality of optical waveguides, and the plurality of optical waveguides may define a plurality of optical switching regions. Each of the optical switching regions may be described as being comprised of multiple discrete optical pathways where a plurality of inputs are optically coupled to a plurality of optical outputs. The plurality of inputs may be optically coupled to the plurality of outputs via a plurality of optical pathways, or routes, that are configured to receive one or more optical signals via optical inputs, and to direct the one or more optical signals to one or more optical outputs (e.g., receive data from a source device and forward data to a destination device). In one embodiment, each of the optical switching regions may be different from each other such that each optical switching region provides a different switching functionality in that at least one input-to-output connection is different from another optical switching region. The plurality of optical switching regions within the optical switching medium may be thought of as a plurality of different fixed optical pathways, and each of the optical switching regions may provide different routing than the other optical switching regions. The optical switching medium, which may be referred to more simply as a "switch" herein, may be movable with respect to the device or apparatus providing optical signals to the optical switching medium and/or receiving optical signals from the optical switching medium.

One illustrative device may include an input/output (I/O) apparatus and an optical switching medium. The I/O apparatus may include a plurality of optical transmitting portions and a plurality of optical receiving portions. The optical switching medium may include a plurality of optical waveguides defining a plurality of optical switching regions. The optical switching medium may be movable with respect to the I/O apparatus to provide switching of optical signals between the plurality of optical transmitting portions and the plurality of optical receiving portions by aligning the optical transmitting portions and optical receiving portions of the I/O apparatus with the plurality of optical switching regions to receive optical signals from the optical transmitting portions and to transmit optical signals to the optical receiving portions.

One illustrative apparatus may include an optical switching medium and an optical switching medium actuator. The optical switching medium may include a plurality of optical waveguides defining a plurality of optical switching regions, and each of the plurality of waveguides may extend from an optical input to an optical output, each optical switching region routing at least one optical input to a different optical output than at least one other optical switching region. The optical switching medium actuator may be operably coupled to the optical switching medium to move the optical switching medium to receive optical signals with the optical inputs of the optical waveguides of the optical switching regions and to transmit optical signals with the optical output of the optical waveguides of the optical switching regions to provide switching of the received optical signals. In other words, the optical switching medium actuator may be described as moving the optical switching medium to present different optical switching regions to, e.g., the I/O apparatus such that the I/O apparatus can use the optical switching medium to provide switching of optical signals.

One illustrative system may include a plurality of optical switching devices, and each of the plurality of optical switching devices may correspond to and may be operable to switch optical signals to and from a node to other optical switching devices of the plurality of optical switching devices. Further, each optical switching device may include an optical switching medium movable to switch optical signals to and from the node, and the optical switching medium may include a plurality of optical waveguides defining a plurality of optical switching regions.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIG. 9 is a diagram of a plurality of different optical switching regions of an illustrative optical switching medium.

DETAILED DESCRIPTION OF ILLUSTRATIVE EMBODIMENTS

Figure 1A:
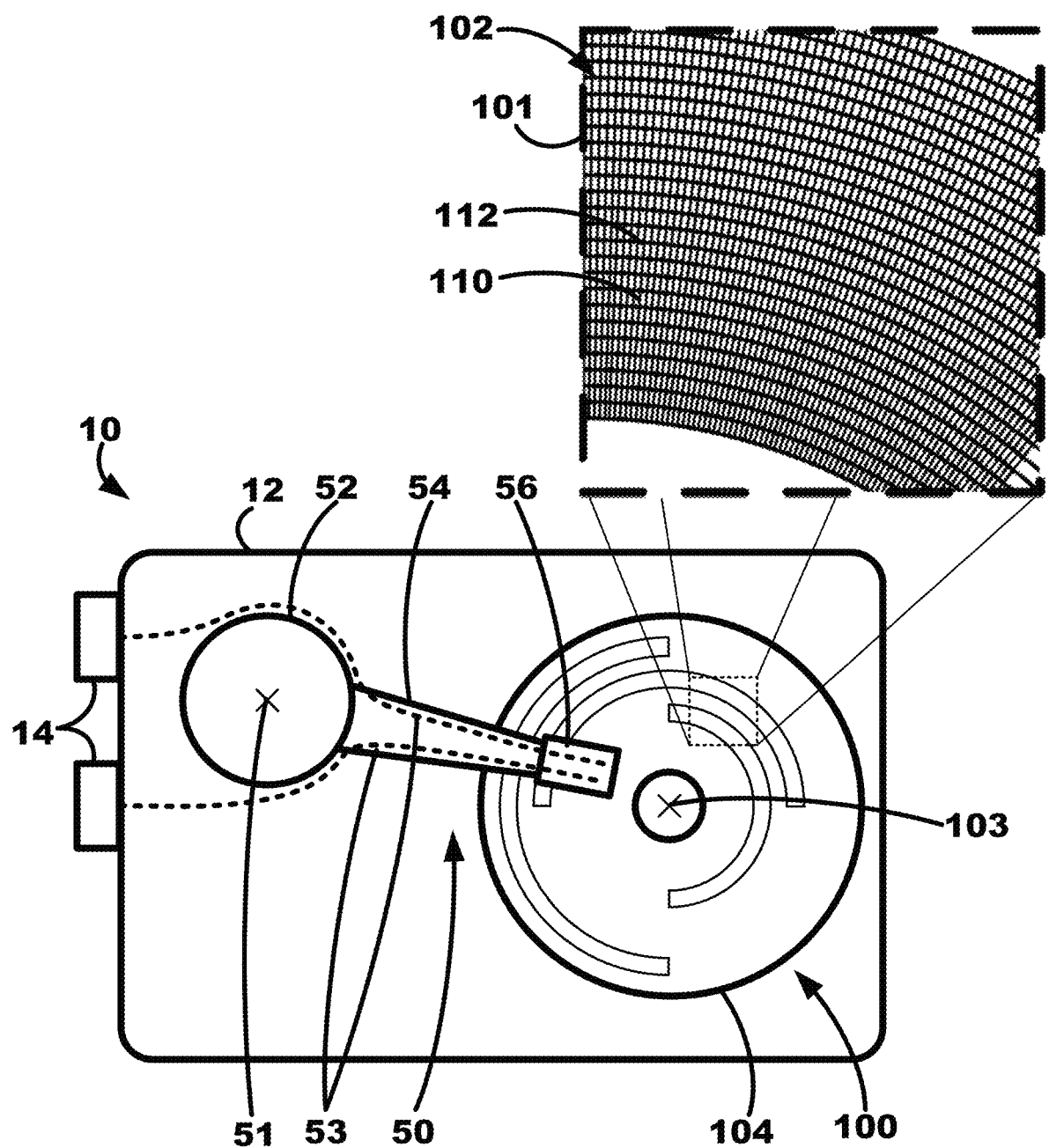
FIG. 1A is a diagram of an illustrative device including an optical switching medium.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Illustrative systems, apparatus, and devices shall be described with reference to FIGS. 1-9. It will be apparent to one skilled in the art that elements or processes from one embodiment may be used in combination with elements or processes of the other embodiments, and that the possible embodiments of such methods, devices, and systems using combinations of features set forth herein is not limited to the specific embodiments shown in the figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

It has been noted that global internet traffic is expected to reach more than 2.2 zettabytes per year by 2020. Such traffic growth drives the need for mega-data centers, each with 100,000s of servers as, for example, 75% of internet traffic remains within data centers (e.g., "east-west" traffic). For example, some mega-data centers may have internal traffic orders of a magnitude larger than in/out traffic (e.g., "north-south" traffic). Due to the need for high data bandwidth, data flows through optical fibers in both east-west and north-south directions. It is, at least, cost prohibitive to optically connect all possible data sources and destinations with dedicated lines. Instead, optical switches are used to direct the internet traffic via the appropriate "avenues" as needed. As internet data traffic has increased, the need for efficient, high bandwidth optical switches has also increased.

Further, advances in machine learning lead to computation with extremely-large data sets that cannot be completed on a single server have driven the need for more efficient interconnects within datacenter. Currently, the data in the interconnects may travel through an optical-electrical-optical conversion due to scheduling data transmissions and congestion control (such that, e.g., data can be stored in an electrical state such as memory since this is not possible with optical signals). Such electrical-optical conversion introduces energy inefficiency into the system as well as requiring more system hardware and complexity.

Data transmission may be maintained in the optical-to-optical domain in order to improve high bandwidth density communication and improve resource utilization while enabling power efficient transfer. For example, some free space optical switches may utilize MEMs devices mounted with mirrors to steer the optical signal (e.g., light, beams, rays, etc.) according to a desired input/output pathway. Further, for example, liquid crystal on silicon (LCOS) may be used to beam steer by altering the angle of reflection of a liquid crystal surface in the path of the optical signal in response to an electrical signal. Such present examples may support connectivity of hundreds of ports but may require complex installation and calibration and provide inadequate switching speed (tens of milliseconds) that make these approaches less than optimal for future datacenters.

Silicon or III-V-based guided-wave switches may be able to achieve nanosecond to microsecond switching speeds but the losses and crosstalk may limit these solutions to a small number of input-output couplings (e.g., less than tens of connections). Further, silicon-based solutions may use a cross-point matrix of connections that will scale in size and complexity according to the input-output count. Therefore, in brief, such silicon or III-V-based guided-wave switches may present challenges for commercial development due to signal loss and poor yield.

In one or more embodiments, the illustrative systems, apparatus, devices, and methods may be described as modified head-disc interface as a non-deterministic optical switch for use in datacenters.

The illustrative systems, apparatus, devices, and methods may be described as leveraging the mechanical architecture of a hard disc drive (HDD), including a spinning disc, a slider head flying (e.g., through the use of an air-bearing surface) over the disc, and a head-gimbal assembly (HGA) to suspend the head over the disc. It may be described that the illustrative systems, apparatus, devices, and methods provide a "head-disc optical switch (HDOS)." A multiplicity of optical signals (e.g., light) may be guided from input ports through a flexible waveguide channel attached to the suspension-gimbal into the input couplers at the back of the slider. The optical signals may be waveguided through the head to the air-bearing surface, where the signals are evanescently coupled into discrete-track-like patterned media on a spinning disc. The spinning disc acts as the optical "switch" in that different interconnection patterns in each sector of the disc provide a multiplicity of input-to-output connection combinations. As the head flies over the spinning disc, the optical signals are effectively switched between different input-to-output connections, and the optical signals are returned back in the same manner (e.g., evanescent coupling back to the head and waveguided along the suspension-gimbal) to the optical output ports.

Further, it may be described that the illustrative systems, apparatus, devices, and methods may provide non-deterministic switching. For example, the illustrative systems, apparatus, devices, and methods may be agnostic to traffic demand. More specifically, the illustrative systems, apparatus, devices, and methods do not change the optical pathway according to increased demand through the action of the disc (although, e.g., it may be altered by control of the HGA and selection of pre-defined optical pathways on the media). The switching is not deterministic at each radius. The illustrative systems, apparatus, devices, and methods may be described as aiming at maximizing network throughput and may be ideally suited for uniform traffic across all inputs and outputs. It has been described that a non-deterministic optical switch may only lose link bandwidth by a factor of two, given that the signal is allowed one intermediate step into the electrical domain, which may be acceptable in an optically switched network to support arbitrary traffic patterns.

The illustrative systems, apparatus, devices, and methods may be described as being significantly less complex and more spatially compact than other non-deterministic switching technologies because, for example, the illustrative systems, apparatus, devices, and methods do not require lenses, mirrors, prisms, collimators, other beam alignment and collaboration structures or devices, etc.

Further, the illustrative systems, apparatus, devices, and methods may be described as using I/O transceivers, or "heads," flying over a patterned disc to create, or provide, dynamically changing optical pathways that achieve optical switching as will be described further here.

An illustrative device 10 including an optical switching medium 100 is depicted in FIG. 1A. In this embodiment, the device 10 includes a housing 12 and the optical switching medium 100 is positioned within the housing 12. The housing 12 may include a pair of input/output (I/O) ports 14. The I/O ports 14 may be configured to received data signals, e.g., in the form of optical signals over fiber optics or any other medium, that are to be switched.

The illustrative device 10 may also include an I/O apparatus 50 that interacts with the optical switching medium 100 to provide the switching functionality provided herein. The I/O apparatus 50 may include a plurality of optical transmitting portions to transmit optical data signals to the optical switching medium 100 and a plurality of optical receiving portions to receive optical data signals from the optical switching medium 100. The optical data signals received by the plurality of optical receiving portions of the I/O apparatus 50 may be "switched" by the optical switching medium 100 and then transmitted back to the I/O apparatus 50. In other words, the optical switching medium 100 presents optical switching regions comprised of different combinations of input to output optical pathways as the medium 100 moves with respect to the I/O apparatus 50.

For example, if the I/O apparatus 50 includes four optical transmitting portions labeled A, B, C, D and four optical receiving portions labeled W, X, Y, Z, each of the optical data signals transmitted by optical transmitting portions A, B, C, D may be switched by the optical switching medium 100 to one of the four optical receiving portions labeled W, X, Y, Z. In one illustrative instance, the optical data signal transmitted from optical transmitting portion A may be transmitted, or "switched," by the optical switching medium 100 to optical receiving portion X, the optical data signal transmitted from optical transmitting portion B may be transmitted, or "switched," by the optical switching medium 100 to optical receiving portion Z, the optical data signal transmitted from optical transmitting portion C may be transmitted, or "switched," by the optical switching medium 100 to optical receiving portion Y, and the optical data signal transmitted from optical transmitting portion D may be transmitted, or "switched," by the optical switching medium 100 to optical receiving portion W. In another illustrative instance, the optical data signal transmitted from optical transmitting portion A may be transmitted, or "switched," by the optical switching medium 100 to optical receiving portion X, the optical data signal transmitted from optical transmitting portion B may be transmitted, or "switched," by the optical switching medium 100 to optical receiving portion Y, the optical data signal transmitted from optical transmitting portion C may be transmitted, or "switched," by the optical switching medium 100 to optical receiving portion W, and the optical data signal transmitted from optical transmitting portion D may be transmitted, or "switched," by the optical switching medium 100 to optical receiving portion Z.

The I/O apparatus 50 may further include an actuator 52, a gimbal assembly 54, and a head portion 56 coupled to an end region of the gimbal assembly 54. The actuator 52 may be coupled to the housing 12 and the gimbal assembly 54 and may be configured to move, or actuate, the gimbal assembly 54 and the head portion 56. More specifically, the actuator 52 may be configured to move, or actuate, the gimbal assembly 54 and the head portion 56 relative to the optical switching medium 100, e.g., so as to align the plurality of optical transmitting and receiving portions with various regions of the optical switching medium 100 to provide the switching functionality described herein.

In this example, the actuator 52 may provide arcuate, or partial rotational, motion of the gimbal assembly 54 and the head portion 56 so as to position the head portion 56 proximate (e.g., over, spaced apart from, etc.) multiple regions of the optical switching medium 100 assuming that the optical switching medium 100 will be rotating, or in rotational motion, as described further herein. More specifically, the actuator 52 may provide arcuate, or partial rotational, motion of the gimbal assembly 52 and the head portion 56 about axis 51 (that extends out of the page along the Z-axis).

The head portion 56 may include the plurality of optical transmitting and receiving portions as will be further described herein with reference to FIGS. 4-7 and may be optically coupled to the I/O ports 14 via one or more or a plurality of optical channels 53 (depicted as two dashed lines in FIG. 1A) extending between the I/O ports 14 and the head portion 56. In one example, the optical channels 53 may be a plurality of fibre optics. In another example, the optical channels 53 may be a plurality of optical waveguides in, or as a part of, a substrate. In one or more embodiments, the suspension of the I/O apparatus 50 can be populated with (potentially) multiple head-gimbal-type assemblies and multiple optical traces may be used for input and optical interconnects.

In one or more embodiments, it may be described that the I/O apparatus 50 is "dumb" in that it does not include any logic or processing circuit configured to determine how or when any of the optical data signals are to be transmitted along the optical channels and to and from the optical switching medium 100. Instead, for example, the I/O apparatus 50 may be described as simply being able to accurately and predictably provide a plurality of different switching configurations over time such that one or more devices connected thereto "know" when and how to transmit optical data signals thereto to achieve the switching, or routing, of its optical data signals the one or more devices desire.

In other words, the head portion, or I/O transceiver, 56 may include n optical receivers, or optical inputs, to receive optical signals from and n transmitters, or optical outputs, to transmit optical signals to the optical switching medium, or "disc," 100 via evanescent coupling. For example, the number of receivers and transmitters that can be placed in the alumina portion of the head portion 56 (e.g., an area of 50 micrometers×0.77 micrometers) may provide over one thousand receivers and transmitters per head portion 56.

The optical switching medium 100 includes a plurality of optical pathways 102 as shown in the enlarged view 101 of the optical switching medium 100 in FIG. 1A. The optical switching medium 100 may further include a substrate 104, within which and/or on which the plurality of optical pathways 102 may be located (e.g., formed, defined, etc.). The substrate 104 may include (e.g., be formed of) one or more materials such as, for example, silicon, alumina, etc. In one embodiment, the substrate 104 may include silicon on insulator wafer. The substrate 104 may define a planar, disc-like structure defining a top surface, a bottom surface opposite the top surface, and an edge extending between the top surface and the bottom surface. The thickness of the substrate 104 may be substantially smaller than the other dimensions (perpendicular to the direction of the thickness) of the substrate 104.

It is to be understood that the substrate 104 and the optical pathways 102 may be described as substrate that is moveable or rotatable so as to present the optical pathways 102 to provide switching functionality as described herein. Further, the substrate 104 and the optical pathways 102 may be described as an array of optical waveguides, or waveguide array, on or within a portion or piece of material (e.g., a block or square of material, a disc of material, etc.). Still further, the substrate 104 and the optical pathways 102 may be described as a movable arrangement of optical waveguides to provide switching functionality as described herein.

The optical pathways 102 may include one or more polymers such as, e.g., polyacrylate, polysiloxane, polynorbonene, silicon, silicon nitride, etc. and/or one or more glasses such as, e.g., chalcogenide glasses, toughed alkali-aluminosilicate sheet glass, etc. As shown in this embodiment, the plurality of optical pathways 102 may be grouped into two groups: a first set, or group, of optical pathways 110 that are extending radially away from a center 103 of the optical switching medium 100 and a second set, or group, of optical pathways 112 that are extending circumferentially and/or accurately around the center 103 of the optical switching medium 100.

In other embodiments, the optical pathways 102 may form, or define, other patterns than shown in FIG. 1. For example, the optical pathways 102 may lie in a grid with a first set, or group, of optical pathways that are extending parallel to a first axis and a second set, or group, of optical pathways that are extending parallel to a second axis different from the first axis (e.g., the second axis may be perpendicular to the first axis).

In other words, the optical switching medium, or disc, may be patterned uniquely in x sectors of the disc. These patterns are waveguides, creating unique optical pathways, or mappings, between n inputs and n outputs. In one example, the number of optical switches provided per square inch of media may be able to provide 1 million switches per media surface.

Further, the optical switching medium, or disc, in the illustrative systems, apparatus, devices, and methods may be described as including servo sectors to help the head identify its location with respect to the sector mappings and waveguides. These servo tracks can be one both of magnetic (e.g., the I/O transceiver may include a giant magnetoresisitive or tunnel-magnetoresistance reader) and optical (e.g., the I/O transceiver may include one or more additional optical channels).

Regardless of the pattern, in one or more embodiments, the first set of optical pathways 110 may intersect with the second set of optical pathways 112 to define a grid as will be described with respect to FIGS. 2-3. The intersections may be used to connect various optical pathways 102 to define a plurality of waveguides as will be described further herein with respect to FIGS. 2-3 and 8A-8B. Thus, the plurality of optical pathways 102 may be described as being used to define or form a plurality of optical waveguides. Each of the plurality of optical waveguides may extend from an optical input configured to receive optical data signals from the optical transmitting portions of the I/O apparatus 50 to an optical output configured to transmit optical data signals to the optical receiving portions of the I/O apparatus 50 as will be described further herein. Further, the waveguides may define a plurality of optical switching regions. Each of the plurality of optical switching regions may include a set, or portion, of the plurality of waveguides that will be aligned with one or both of the transmitting and receiving portions of the I/O apparatus 50 at the same time as will be further described herein.

The optical switching medium 100 may be movable at least with respect to the I/O apparatus 50, and in particular, with respect to the transmitting and receiving portions positioned, or located on, the head portion 56. In this embodiment, the optical switching medium 100 may be rotatable about the central axis 103 similar to, for example, a hard disc drive. Additionally, the movement of the optical switching medium 100 may be described relative to the housing 12 in that, for example, the optical switching medium 100 may be movable relative to the housing 12. To provide such movement, the device 10 may further include an optical switching medium actuator operably coupled to the optical switching medium 100 to move the optical switching medium 100 in a rotational manner about the central axis 103.

Further, as previously described, the I/O apparatus 50 may also be movable relative to the optical switching medium 100 and the housing 12. In some embodiments, only one of the I/O apparatus 50 and the optical switching medium 100 may be movable relative to a fixed reference point. For example, the I/O apparatus 50 may not be movable relative to the housing 12 while the optical switching medium 100 is movable relative to the housing 12. Further, for example, the I/O apparatus 50 may be movable relative to the housing 12 while the optical switching medium 100 may not be movable relative to the housing 12.

The movement of the optical switching medium 100 may generally be at a constant rate such as, e.g., 5400 rotations per minute (RPM) or 7200 RPM. A constant rate may provide accurate predictable positioning of the I/O apparatus 50 with respect to the optical switching medium 100 such that one or more devices connected thereto may "know" when particular optical switching regions are able to be utilized. In this way, one or more devices may "know" when to send optical data signals to the device 10 so as to be switched, or routed, according the device 10 intention. In one embodiment, the device 10 may communicate with the operably connected devices such that such devices have synchronization knowledge of the switching possibilities provided by the device 10.

Figure 1B:
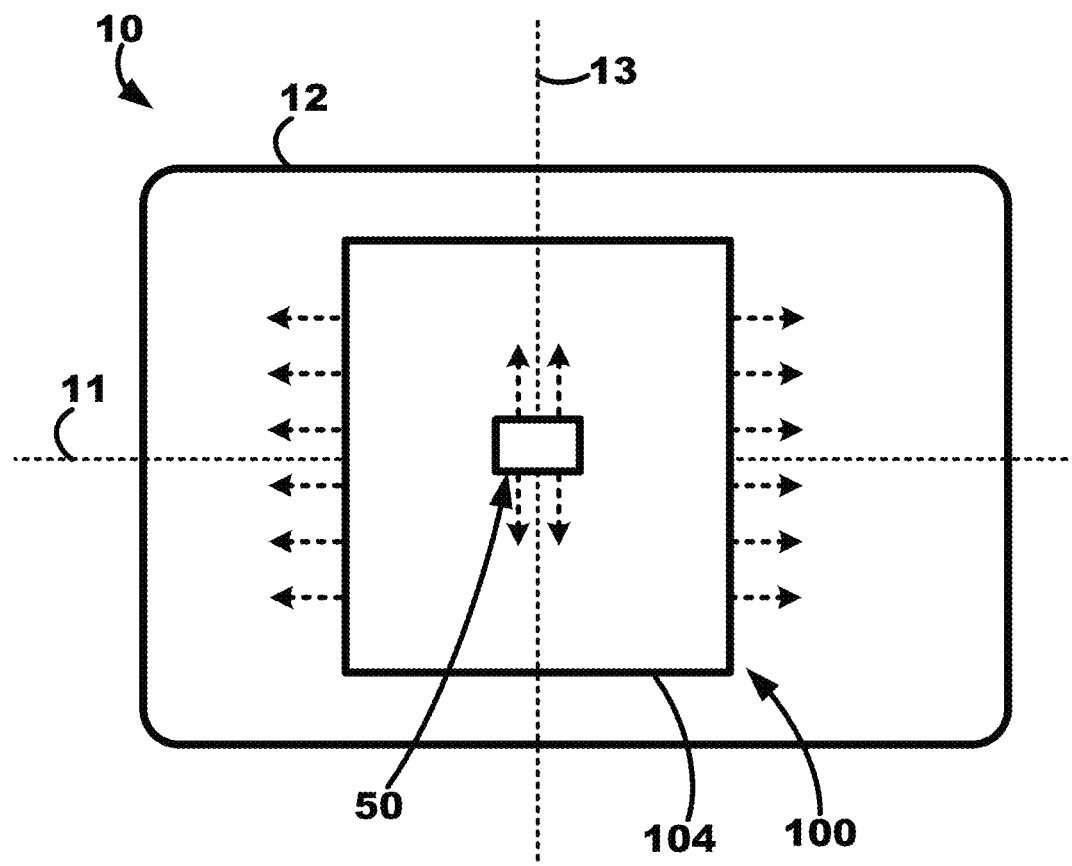
FIG. 1B is a diagram of another illustrative device including an optical switching medium.

The optical switching medium 100 may also move in other ways than rotation. For example, the optical switching medium 100 may move within a plane along a first axis 11 that is parallel (e.g., extends along) the plane as shown in FIG. 1B. As shown, the substrate 104 of the optical switching medium 100 may linearly move, or oscillate, right and left along the axis 11 while the I/O apparatus 50 moves up or down (relative to the page) along axis 13. In this way, the I/O apparatus 50 may be positionable about any portion or region of the optical switching medium 100 similar as the device of FIG. 1A. In this embodiment, the substrate 104 is rectangular. In other embodiments, the substrate 104 may be any size or shape to facilitate the optical switching functionality described herein. Additionally, the optical switching medium 100 may oscillate (e.g., move back-and-forth) at a frequency along a single axis (where, e.g., the single axis 13 extends along the longitudinal axis of the optical switching medium 100). Further, although this embodiment depicted in FIG. 1B moves linearly along a single axis, it is to be understood that the substrate 104 may along more than single axis while lying a single plane. In one embodiment, the substrate 104 may move along each of the first axis 11 and the second axis 13 while the I/O apparatus 50 is movable or stationary.

In another embodiment, the I/O apparatus 50 may be sized so as to cover at least one dimension of the optical switching medium 100 such that the I/O apparatus 50 may not need to move. In other words, the I/O apparatus 50 may remain stationary as the optical switching medium 100 moves with respect to the I/O apparatus 50 to provide access to all of the optical waveguides and optical switching regions as further described herein.

Further, the optical switching medium 100 may move along more than one axis. For example, the optical switching medium 100 may move back-and-forth along a first axis and back-and-forth along a second axis. Both the first axis and the second axis may lie in the same plane or may not lie in the same plane. Further, the first axis may be perpendicular to the second axis in some embodiments.

Figure 2:
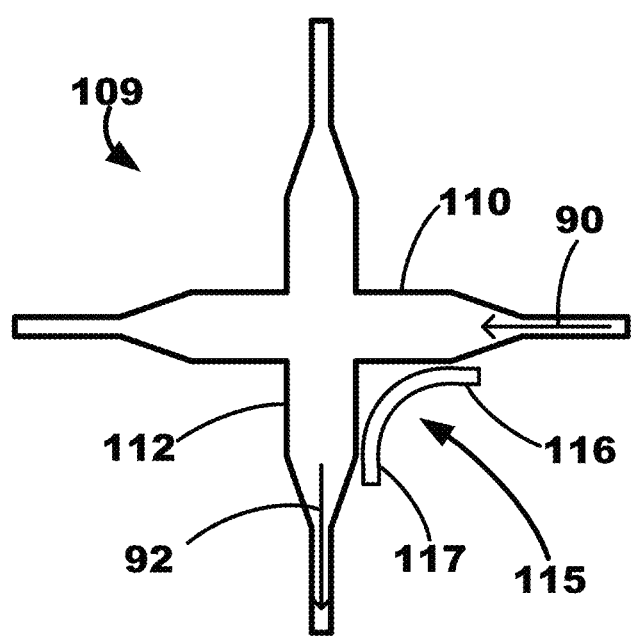
FIG. 2 is a plan view of an intersection of illustrative optical pathways of the optical switching medium of FIGS. 1A-1B.
Figure 3:
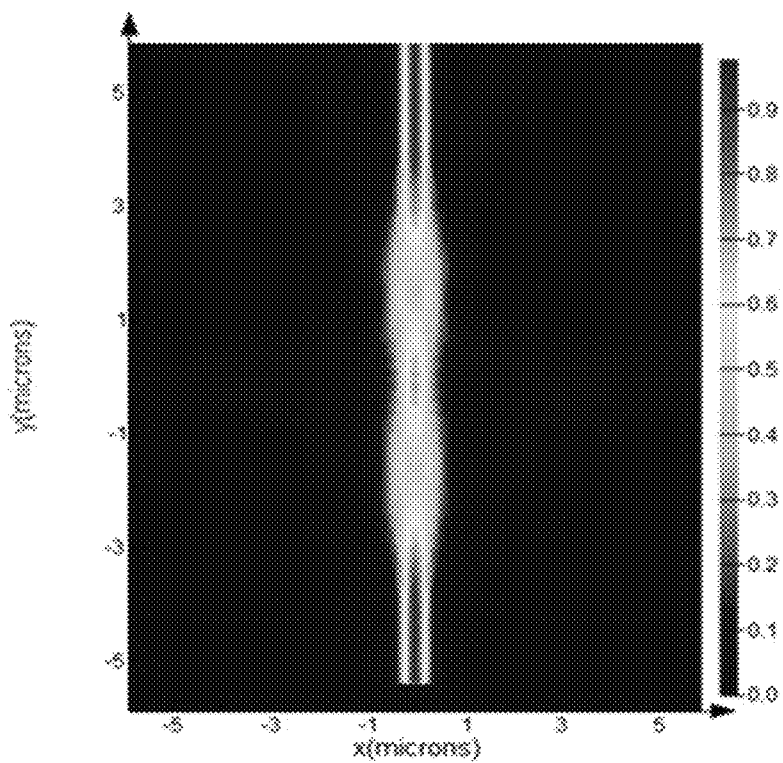
FIG. 3 is an image of an intersection of illustrative pathways of the optical switching medium of FIGS. 1A-1B.

A plan view and an image of an illustrative intersection 109 between optical pathways 102 of the optical switching medium 100 are depicted in FIGS. 2-3. As shown, a first optical pathway 110 intersects with a second optical pathway 112, each pathway 110, 112 share a similar geometric profile as described herein. The intersection 109 may be designed to allow optical data signals to pass through the intersection 109 along the first optical pathway 110 with interfering with optical data signals passing through the intersection 109 along the second optical pathway 112. In other words, data optical signals traveling along the first optical pathway 110 may continue traveling along the first optical pathway 110 without changing direction due to interference by the second optical pathway 112.

Additionally, the intersection 109 may be configured to redirect, or move, optical data signals from the first optical pathway 110 to the second optical pathway 112 or from the second optical pathway 112 to the first optical pathway 110 when desired to provide the optical waveguides of the optical switching medium 100 as described in more detail further herein. In one embodiment, an evanescent coupler 115 may be used to redirect, or move, optical data signals from the first optical pathway 110 to the second optical pathway 112 or from the second optical pathway 112 to the first optical pathway 110. For example, optical data signals may be transmitted in the first optical pathway 110 represented by arrow 90. Such optical data signals 90 may be evanescently coupled to a first segment 116 the evanescent coupler 115 and transmitted around the curve, or bend, of the evanescent coupler 115 to the second segment 117 of the evanescent coupler 115. The second segment 117 of the evanescent coupler 115 may be evanescently coupled to the second optical pathway 112 to transmit in the optical data signals along the second optical pathway 112 as indicated by arrow 92. Thus, data optical signals transmitted on the first optical pathway 110 may be transmitted onto the second optical pathway 112 via the evanescent coupler 115. Similar to the optical pathways 102, 110, 112, the evanescent coupler 115 may include one or more polymers such as, e.g., polyacrylate, polysiloxane, polynorbonene, silicon nitride, etc. and/or one or more glasses such as, e.g., chalcogenide glasses, toughed alkali-aluminosilicate sheet glass, etc. Further, to provide the evanescent coupling between the evanescent coupler 115 and the respective optical pathways 110, 112, the evanescent coupler 115 may be spaced apart, or gapped, from the respective optical pathways 110, 112 an evanescent coupling distance so as to provide the evanescent coupling therebetween.

It is to be understood that this evanescent coupling distance may change depending on a plurality of factor such as, e.g., materials, geometry, position, etc. of the evanescent coupler 115 and the optical pathways 110, 112. For example, the crossover length of an evanescent coupling may be described as the length where all the power of the optical data signals is transferred between waveguides. The crossover length may be described as a function of the spacing, or gap, between the evanescently coupled portions, wherein the crossover length increases in response to the spacing, or gap, increasing. For example, if the spacing, or gap, between the evanescently coupled portions, such as the first optical pathway 110 and the first segment 116 of the evanescent coupler, is 200 nanometers, then the cross-over length may be about 1 micrometer. Evanescent coupling spacing may be in the 100s of nanometer gap between the two portions to be coupled.

An image of an illustrative intersection 109 between optical pathways 102 of the optical switching medium 100 depicted in FIG. 3 illustrates that an illustrative intersection may provide insertional loss at 1310 nanometers of 0.0168 decibels (dB) and crosstalk of −37 dB, and wavelength sensitivity of 0.09 dB in the 60 nanometer range.

Figure 4:
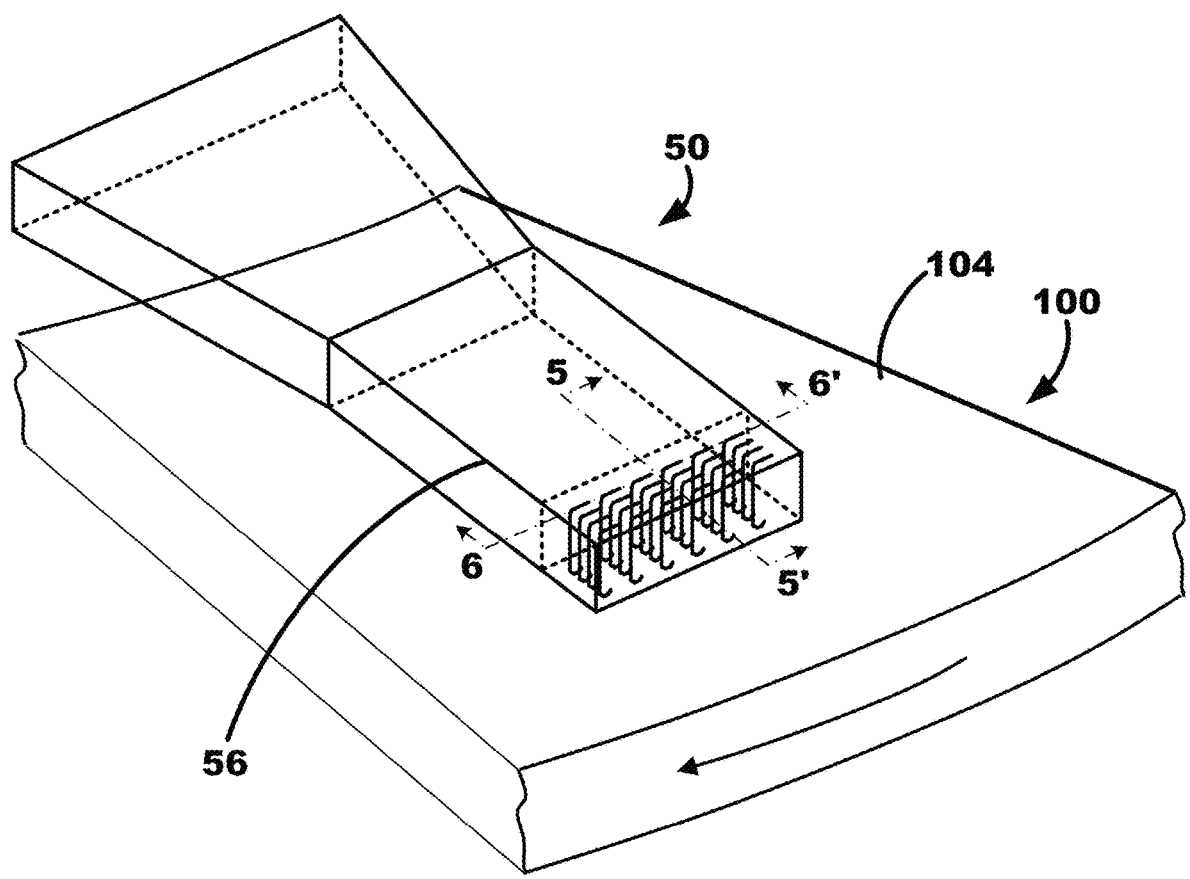
FIG. 4 is a diagram of an illustrative I/O apparatus for use with the device of FIG. 1A.
Figure 5:
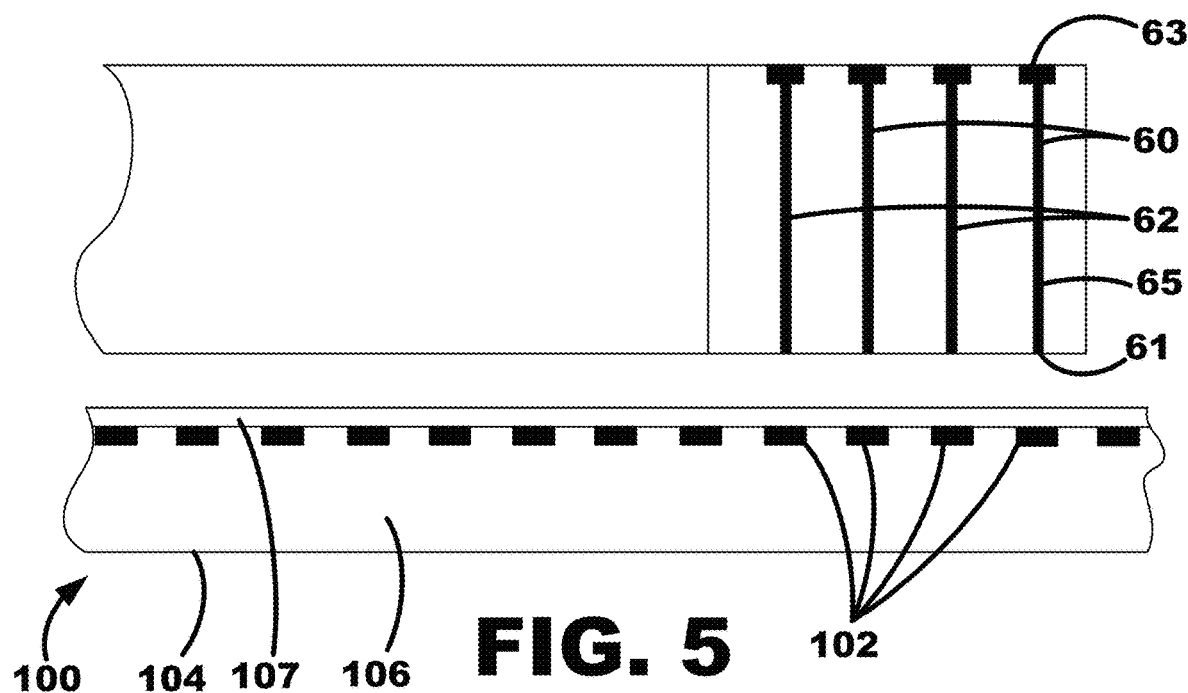
FIG. 5 is a cross-sectional view of the I/O apparatus and the optical switching medium of FIG. 4 taken across line 5-5'.
Figure 6:
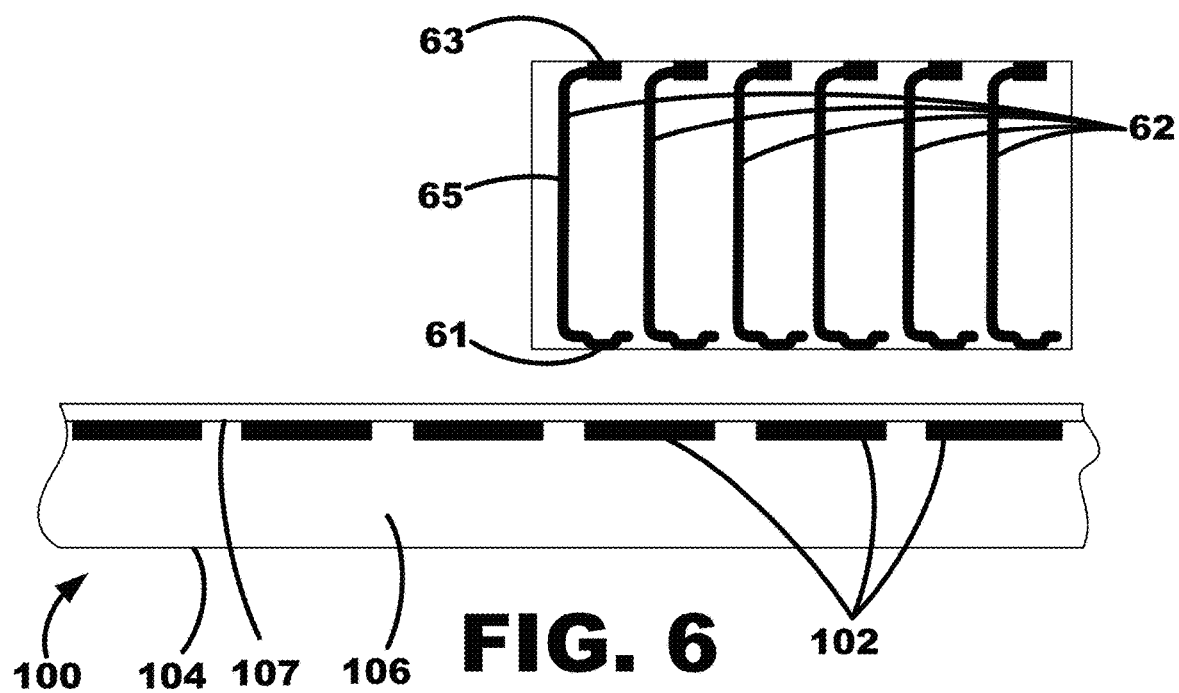
FIG. 6 is another cross-sectional view of the I/O apparatus and the optical switching medium of FIG. 4 taken across line 6-6'.

An illustrative I/O apparatus 50 is depicted in FIGS. 4-6. The I/O apparatus 50 is depicted transparently in FIG. 4 so that internal components and such internal components positioning and routing may be shown. The I/O apparatus 50 as depicted includes a plurality of optical transmitting portions 60 and a plurality of optical receiving portions 62. Although in this embodiment the I/O apparatus 50 includes two rows of six optical transmitting portions 60 and two rows of six optical receiving portions 62, it is to be understood that any number of optical receiving and transmitting portions 60 may be utilized in any arrangement.

As described herein, each of the optical transmitting portions 60 may be configured to receive optical data signals from the I/O ports 14 of the device 10 via on one or more or a plurality of optical channels 53 as shown in FIG. 1A and transmit such optical data signals to the optical switching medium 100. Further, each of the optical receiving portions 62 may be configured to receive optical data signals from the optical switching medium 100 and to transmit such received optical data signals to the I/O ports 14 of the device 10 via on one or more or a plurality of optical channels 53.

As shown in FIGS. 4-5, each of the optical transmitting and receiving portions 60, 62 may include multiple segments or regions. In one embodiment, it may be described that each of the optical transmitting and receiving portions 60, 62 includes an evanescent coupling segment 61 terminating an end region of the each optical transmitting and receiving portions 60, 62. The evanescent coupling segments 61 may extend in a direction parallel to that what they are to be evanescently coupled to for a crossover, or interaction, length so as to provide evanescent coupling therebetween as will be shown and described with respect to FIGS. 5-6. In other words, at least a portion, namely, e.g., the evanescent coupling segments 61, of the optical transmitting portions 60 and receiving portions 62 of the I/O apparatus 50 may extend parallel to at least a portion (e.g., the optical inputs and outputs as further described herein) of the plurality of optical pathways 102 of the optical switching medium 100.

Although the illustrative embodiment depicted in FIGS. 4-6 utilize evanescent coupling between optical transmitting and receiving portions 60, 62 and the waveguides of the optical switching medium 100, it to be understood that optical data signals may be transmitted therebetween using any techniques, structures, and processes configured to do so. For example, in one embodiment, the optical transmitting and receiving portions 60, 62 and the waveguides of the optical switching medium 100 may be configured to provide radiative coupling therebetween using, e.g., appropriate lens, mirrors, gratings, inverse couplers, etc.

Further, each optical transmitting and receiving portions 60, 62 includes an optical coupler 63, an optical connecting element 65, and the evanescent coupling segment 61 (labeled on a single optical transmitting portion 60 in FIG. 5 and on a single optical receiving portion 62 in FIG. 6). The optical coupler 63 may a portion, or region, of the optical transmitting and receiving portions 60, 62 that is configured to be operatively coupled to the optical channels 53 of the I/O apparatus 50 to operatively couple the optical transmitting and receiving portions 60, 62 to the I/O ports 14. The optical coupler 63 is also operatively coupled to the optical connecting element 65. The optical connecting element 65 may be configured to transmit optical data signals between (e.g. from or to) the optical coupler 63 and the evanescent coupling segment 61. More specifically, for the optical transmitting portions 60, the optical connecting element 65 may be configured to transmit optical data signals from the optical coupler 63 to the evanescent coupling segment 61 for transmission of the optical data signals to the waveguides of the optical switching medium 100. For the optical receiving portions 62, the optical connecting element 65 may be configured to transmit optical data signals from the evanescent coupling segment 61 to the optical coupler 63 for transmission of the optical data signals to the optical channels 53.

The evanescent coupling segments 61 may extend parallel to the optical pathways 102 of the optical switching medium 100 so as to provide an appropriate crossover length for evanescent coupling therebetween. Additionally, as shown, each of the evanescent coupling segments 61 may define a pair of stepped regions on either end of the evanescent coupling segment 61 to provide low-loss routing of light as will be further described with reference to FIG. 7.

As shown, the optical switching medium 100 may include, or be defined by, the substrate 104. The substrate 104 may include one or more or a plurality of layers so as to provide the functionality of the optical switching medium 100 described herein. In the example depicted in FIGS. 4-5, the substrate 104 includes a base layer 106. The base layer 106 may include (e.g., be formed of) one or more materials such as, e.g., silicon, silicon dioxide, silicon nitride, AlTiC, alumina etc. The plurality of optical pathways 102 may be positioned within the base layer 106. In one embodiment, the optical pathways 102 may be formed, or defined, within the base layer 106 using semiconductor processing techniques (e.g., etching, deposition, etc.). It is to be understood that the optical pathways 102 may be formed using any techniques or processes. Further, as shown, the optical pathways 102 may extend longer in the concentric or arcuate direction as depicted in the cross-section of FIG. 6 than the radial direction as depicted in the cross-section of FIG. 5 so as to provide an appropriate crossover length for effective evanescent coupling to the evanescent coupling segments 61.

A cover layer 107 may be provided over the base layer 106 and the optical pathways 102. The cover layer 107 may include (e.g., be formed of) one or more materials such as, e.g., diamond-like carbon, etc.

Figure 7:
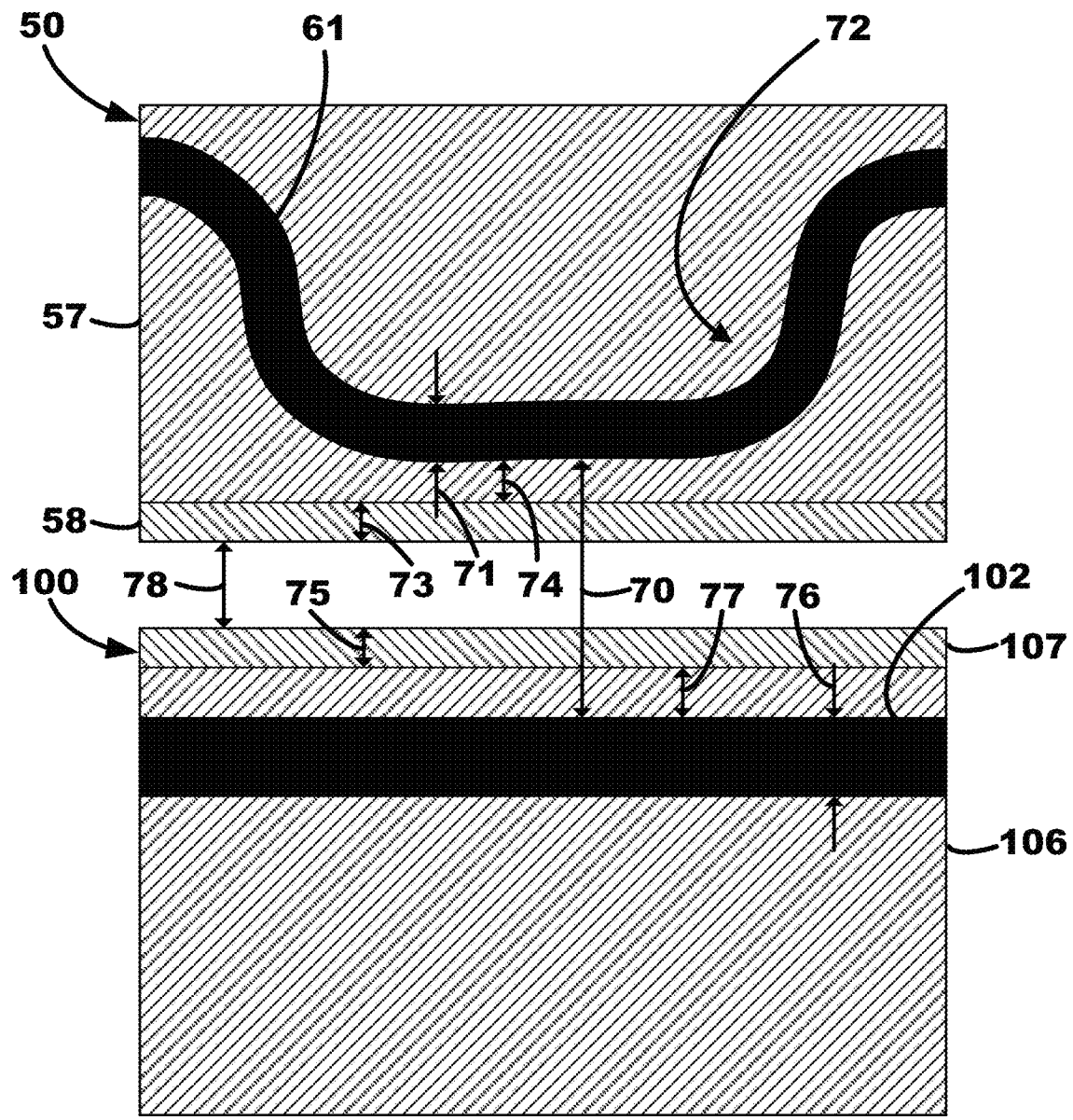
FIG. 7 is another diagram of evanescent coupling between an illustrative waveguide and an illustrative optical switching medium.

A more detailed cross-sectional diagram of an illustrative I/O apparatus 50 and optical switching medium 100 is depicted in FIG. 7. In this depiction, the evanescent coupling segment 61 is depicted spaced away from an optical pathway 102 by a gap distance 70. The gap distance 70 may be between about 100 nm to about 300 nm. In one embodiment, the gap distance 70 is about 250 nm. The evanescent coupling segment 61 may define a thickness 71 of about 150 nm to about 250 nm. In one embodiment, the evanescent coupling segment 61 may have, or define, a thickness of 220 nm. Further, the evanescent coupling segment 61 may define one or more step regions 72 (e.g., curves, bends, etc. away from the optical switching medium 100) defining a radius of about 5 micrometers to about 15 micrometers. In one embodiment, the step regions 72 define a radius of about 5 micrometers.

The head portion 56 may include one or more or a plurality of layers so as to provide the functionality of the I/O apparatus 50 described herein. In the example depicted in FIG. 7, the head portion 56 may include a base substrate 57 and a cover layer 58. The base substrate 57 may include (e.g., be formed of) one or more materials such as, e.g., aluminum oxide, silicon dioxide, etc. The cover layer 58 may include (e.g., be formed of) one or more materials such as, e.g., diamond-like carbon, etc. The cover layer 58 may define a thickness 73 of about 1 nm to about 5 nm. In one embodiment, the cover layer 58 has, or defines, a thickness 73 of 2 nm.

Further, the base substrate 57, the cover layer 58, and the evanescent coupling segment 61 may be spaced apart from each in using various distances so as to provide the functionality described herein. For example, the cover layer 58 may be spaced apart from the evanescent coupling segment by a distance 74 that is about 5 nm to about 20 nm. In one embodiment, the distance 74 is 5 nm.

Similar to the optical switching medium 100 described herein with reference to FIGS. 5-6, the optical switching medium 100 may include the base layer 106 and the cover layer 107. The cover layer 107 may define a thickness 75 of about 1 nm to about 3 nm. In one embodiment, the cover layer 107 defines, or has, a thickness 75 of 1.5 nm. The optical pathways 102 may define a thickness 76 of about 1 to about 5 nm. In one embodiment, the optical pathways 102 define, or have, a thickness 76 of 3 nm.

Further, the base layer 106 and the cover layer 107, and the optical pathways 102 may be spaced apart from each in using various distances so as to provide the functionality described herein. For example, the cover layer 107 may be spaced apart from the optical pathways by a distance 77 that is about 1 nm to about 20 nm. In one embodiment, the distance 77 is 10 nm.

Additionally, although the optical pathways 102 in this example are depicted as existing in a single layer, it is to be understood that the optical pathways 102 can extend in more than one (e.g., a plurality) of different layers so as to define the optical switching regions 140 as described herein. For instance, one or more optical structures such as light escalators, evanescent couplers, gratings, etc. may be used to move optical signals between optical pathways 102 located in different layers. In other words, the optical pathways 102 may be occupy different levels, or layers, in the medium 100. The light can be transferred from a shallower layer to a deeper layer through the use of various structures or mechanisms.

Still further, the head portion 56 of the I/O apparatus may be positioned adjacent to or spaced apart from to the optical switching medium 100 so as to provide the functionality provided herein. In one or more embodiments, the head portion 56, or in particular, the cover layer 58 of the head portion 56 may be in contact with, or adjacent to, the optical switching medium 100, or in particular, the cover layer 107 of the optical switching medium 100. In one or more embodiments, the head portion 56, or in particular, the cover layer 58 of the head portion 56 may be spaced apart from the optical switching medium 100, or in particular, the cover layer 107 of the optical switching medium 100, by a gap, or fly height, 78. Thus, gap, or fly height, 78 may be extend between the head portion 56 and the optical switching medium 100. The gap, or fly height, 78 may be between about 150 nm to about 250 nm. In one embodiment, the gap 78 is 200 nm.

Figure 8A:
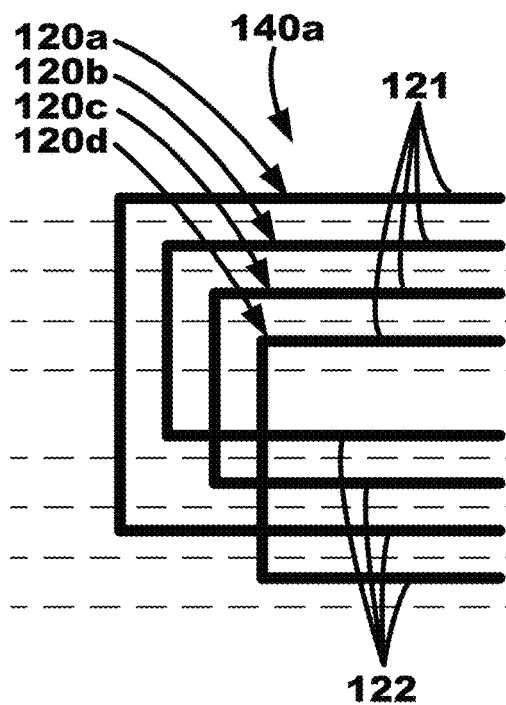
FIGS. 8A-8B are plan views of optical switching regions of an illustrative optical switching medium.
Figure 8B:
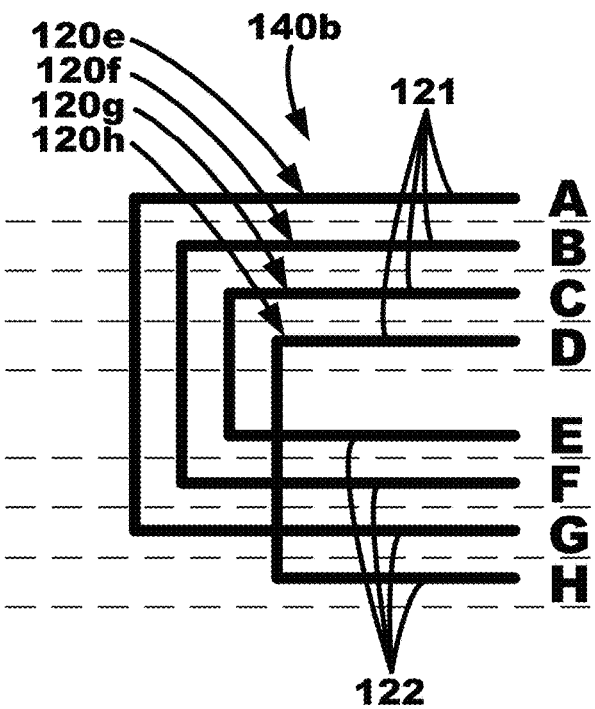

As described herein, the optical switching medium 100 includes a plurality of optical waveguides 120 that are defined by the plurality of optical pathways 102. Four illustrative optical waveguides 120a, 120b, 120c, 120d are depicted in FIG. 8A, and four illustrative optical waveguides 120e, 120f, 120g, 120h are depicted in FIG. 8B. Each of the optical waveguides 120 may be described as an optical path extending from an optical input 121 to an optical output 122. Each optical input 121 may be configured to receive (e.g., via evanescent coupling) optical data signals from one of the optical transmitting portions 60 and each optical output 122 may be configured to transmit (e.g. via evanescent coupling) optical data signals to one of the optical receiving portions 62 when such optical inputs and outputs 121, 122 are aligned with the transmitting and receiving portions 60, 62 of the I/O apparatus 50. Thus, with reference to FIG. 8A, the I/O apparatus 50 may transmit four optical data signals into the optical waveguides 120a, 120b, 120c, 120d via the respective optical inputs 121 and then receive the four optical data signals from the optical waveguides 120a, 120b, 120c, 120d via the respective optical outputs 122.

Groups of optical waveguides configured to be aligned with the I/O apparatus 50 at the same time may be referred to as optical switching regions 140. For example, the four illustrative optical waveguides 120a, 120b, 120c, 120d may collectively be referred to as an optical switching region 140a, and the four illustrative optical waveguides 120e, 120f, 120g, 120h may collectively be referred to as an optical switching region 140b. The optical switching medium 100 may include a plurality of optical switching regions 140, each defined by a plurality of optical waveguides 120. Further, each of the plurality of optical switching regions 140 may provide different switching functionality than at least one other optical switching region 140. For example, one optical switching region 140 may receive optical data signals at the optical inputs 121 and switch the optical data signals to different optical outputs 122 than at least one other optical switching region 140 of the illustrative optical switching medium 100. In one embodiment, each of the optical switching regions 140 of the optical switching medium 100 provides different switching functionality than every other optical switching region 140.

Two examples of this different switching functionality will be described herein with reference to the optical switching regions 140a, 140b of FIGS. 8A-8B. As shown in FIG. 8A, for example, optical data signal I may be received by the optical input 121 of the optical waveguide 120a in row A, optical data signal II may be received by the optical input 121 of the optical waveguide 120b in row B, optical data signal III may be received by the optical input 121 of the optical waveguide 120c in row C, and optical data signal IV may be received by the optical input 121 of the optical waveguide 120d in row D. The optical data signal I may propagate along the optical waveguide 120a to the optical output 122 in row G, the optical data signal II may propagate along the optical waveguide 120b to the optical output 122 in row E, the optical data signal III may propagate along the optical waveguide 120c to the optical output 122 in row F, and the optical data signal IV may propagate along the optical waveguide 120d to the optical output 122 in row H. In this way, when an I/O apparatus 50 is positioned to transmit and receive data optical signals from the optical switching region 140 of FIG. 8A, the I/O apparatus 50 may transmit optical data signal I on row A, optical data signal II on row B, optical data signal III on row C, and optical data signal IV on row D using the transmitting portions 60 and receive optical data signal I on row G, optical data signal II on row E, optical data signal III on row F, and optical data signal IV on row H using the receiving portions 62.

As shown in FIG. 8B, for example, optical data signal V may be received by the optical input 121 of the optical waveguide 120e in row A, optical data signal VI may be received by the optical input 121 of the optical waveguide 120f in row B, optical data signal VII may be received by the optical input 121 of the optical waveguide 120g in row C, and optical data signal VIII may be received by the optical input 121 of the optical waveguide 120h in row D. The optical data signal V may propagate along the optical waveguide 120e to the optical output 122 in row G, the optical data signal VI may propagate along the optical waveguide 120f to the optical output 122 in row F, the optical data signal VII may propagate along the optical waveguide 120g to the optical output 122 in row E, and the optical data signal VIII may propagate along the optical waveguide 120h to the optical output 122 in row H. In this way, when an I/O apparatus 50 is positioned to transmit and receive data optical signals from the optical switching region 140b of FIG. 8B, the I/O apparatus 50 may transmit optical data signal V on row A, optical data signal VI on row B, optical data signal VII on row C, and optical data signal VIII on row D using the transmitting portions 60 and receive optical data signal V on row G, optical data signal VI on row F, optical data signal VII on row E, and optical data signal VIII on row H using the receiving portions 62.

The optical switching medium 100 may include a plurality of optical switching regions 140 patterned, or arranged, thereabout as depicted in FIG. 9. The optical switching medium 100 may move with respect to the I/O apparatus 50 so as to align the optical transmitting portions and optical receiving portions with one optical switching region 140 at a time such that the I/O apparatus 50 can transmit and receive optical data signals switched according to the optical switching region 140.

In the example depicted in FIG. 9, each of plurality of optical switching regions 140 includes four optical waveguides including optical inputs and optical outputs arranged parallel to the direction of motion 190 of the optical switching medium 100. The optical switching regions 140 of FIG. 9 are similar to the layout of the optical switching regions 140 of FIGS. 8A-8B. In fact, the optical switching region 140a and the optical switching region 140b are both identified in FIG. 9.

The direction of travel 190 of the optical switching medium 100 is depicted to indicate how the optical switching regions 140 will move with respect to the I/O apparatus 50. The optical inputs 121 and the optical outputs 122 may be described as extending along the direction of travel 190. More specifically, the optical inputs 121 and the optical outputs 122 of each single optical switching region 140 may aligned with each other in a direction parallel to the direction of travel 190. Additionally, the optical transmitting portions 60 and the optical receiving portions 62 of the I/O apparatus 50 may be aligned in a similar fashion such that the optical transmitting portions 60 and the optical receiving portions 62 may be aligned with a single optical switch region 140 at a time to transmit optical data signals thereto and receive optical data signals therefrom.

Nonetheless, it is to be understood that the optical switching regions 140, and respective optical waveguides thereof, depicted in FIG. 9 are merely one example, and the optical switching regions 140, and respective optical waveguides thereof, may be positioned or arranged about the optical switching medium 100 in any configuration so as to provide the functionality described herein.

Furthermore, in one or more embodiments, the number of gimbal assemblies 54, the number of head portions 56 per gimbal assembly 54, the number of I/O apparatus 50 per surface of optical switching medium 100, and the number of optical switch media 100 surfaces per device are intentionally unspecified. Additionally, the use of multiple head portions 56 per optical switching medium 100 surface such as, for example, a head portion 56 dedicated to input and a head portion 56 dedicated to output, or head portions 56 servicing wholly independent input/outputs from one another, are within the scope of this disclosed solution.

Still further, input to output optical waveguide, or pathway, design can be in radial, circumferential, and z-directions (deposition direction) of the optical switching medium 100. Also, "disc" sectors areas may not be of uniform angular dimension. If longer a particular permutation of input-to-output coupling is utilized, then that pathway can be situated within a sector having a longer angular fraction of the disc.

Since the I/O apparatus 50 is capable of rotation, different radial locations of the optical switching medium 100 can be accessed. Designing different input/output coupling patterns at each radius provides another enabler for different dwell times in a single pathway combination, which may be achieved by consuming different angular fractions per sector at each of the different radii. Different radii can also be accessed when certain pathways, e.g., input X to output Y, may be required for longer periods of time. For example, a particular radial section of the media can be dedicated to this pathway (which does not need to be limited to a single input/output pairing) and can be accessed by rotating I/O apparatus 50 to the desired radial track.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed:

1. Apparatus comprising:
   an optical switching medium comprising a plurality of optical waveguides defining a plurality of optical switching regions, each of the plurality of waveguides extending from an optical input to an optical output, each optical switching region routing at least one optical input to a different optical output than at least one other optical switching region; and
   an optical switching medium actuator operably coupled to the optical switching medium to move the optical switching medium to position the optical inputs of the optical waveguides of the optical switching regions to receive optical signals and to position the optical outputs of the optical waveguides of the optical switching regions to transmit optical signals to provide switching of the received optical signals, wherein the optical switching medium comprises:
   a plurality of first optical pathways; and
   a plurality of second optical pathways, each second optical pathway optically couples two of the first optical pathways, wherein the plurality of waveguides are defined using the first and second optical pathways.

2. The apparatus of claim 1, wherein the optical switching medium actuator moves the optical switching medium rotatably about a rotation axis.

3. The apparatus of claim 1, wherein the optical switching medium actuator moves the optical switching medium along at least one axis.

4. The apparatus of claim 1, wherein each optical switching region routes at least one optical input to a different optical output than at least one other optical switching region.

5. The apparatus of claim 1, wherein the first optical pathways extend arcuately and the second optical pathways extend radially.

6. The apparatus of claim 1, wherein each second optical pathway optically couples two of the first optical pathways via an evanescent coupler.

7. A system comprising:
   an input/output (I/O) apparatus comprising:
     a plurality of optical transmitting portions, and
     a plurality of optical receiving portions;
   an optical switching medium comprising a plurality of optical waveguides defining a plurality of optical switching regions, the optical switching medium movable with respect to the I/O apparatus to position the optical switching regions to align the optical transmitting portions and optical receiving portions of the I/O apparatus with the plurality of optical switching regions to receive optical signals from the optical transmitting portions and to transmit optical signals to the optical receiving portions to provide switching of optical signals between the plurality of optical transmitting portions and the plurality of optical receiving portions; and
   a gimbal assembly coupled to the I/O apparatus to suspend the I/O apparatus away from the optical switching medium.

8. The system of claim 7, wherein the optical transmitting portions and receiving portions are evanescently couplable to the optical waveguides of the plurality of optical switching regions to transmit thereto and receive optical signals therefrom when aligned thereto.

9. The system of claim 7, wherein at least a portion of the optical transmitting portions and receiving portions of the I/O apparatus extend parallel to at least a portion of the plurality of optical waveguides of the optical switching medium.

10. The system of claim 7, wherein the system further comprises an optical switching medium actuator to move the optical switching medium rotatably about a rotation axis.

11. The system of claim 7, wherein the system further comprises an optical switching medium actuator to move the optical switching medium along at least one axis.

12. The system of claim 7, wherein the system further comprises an I/O actuator to move the I/O apparatus relative to the optical switching medium.

13. The system of claim 7, wherein each of the plurality of waveguides extends from an optical input to an optical output, wherein the optical inputs and optical outputs of only one optical switching region are aligned with the transmitting portions and receiving portions of the I/O apparatus at a time, wherein each optical switching region routes at least one optical input to a different optical output than at least one other optical switching region.

14. The system of claim 7, wherein the plurality of optical waveguides comprises:
   a plurality of first optical pathways; and
   a plurality of second optical pathways, each second optical pathway optically couples two of the first optical pathways, wherein the plurality of waveguides are defined using the first and second optical pathways.

15. The system of claim 14, wherein the first optical pathways extend arcuately and the second optical pathways extend radially.

16. The system of claim 14, wherein each second optical pathway optically couples two of the first optical pathways via an evanescent coupler.

17. A system comprising:
   an input/output (I/O) apparatus comprising:
     a plurality of optical transmitting portions, and
     a plurality of optical receiving portions;

an optical switching medium comprising a plurality of optical waveguides defining a plurality of optical switching regions, the optical switching medium movable with respect to the I/O apparatus to position the optical switching regions to align the optical transmitting portions and optical receiving portions of the I/O apparatus with the plurality of optical switching regions to receive optical signals from the optical transmitting portions and to transmit optical signals to the optical receiving portions to provide switching of optical signals between the plurality of optical transmitting portions and the plurality of optical receiving portions; and an I/O actuator to move the I/O apparatus relative to the optical switching medium.

18. The system of claim 17, wherein the optical transmitting portions and receiving portions are evanescently couplable to the optical waveguides of the plurality of optical switching regions to transmit thereto and receive optical signals therefrom when aligned thereto.

19. The system of claim 17, wherein at least a portion of the optical transmitting portions and receiving portions of the I/O apparatus extend parallel to at least a portion of the plurality of optical waveguides of the optical switching medium.

20. The system of claim 17, wherein the system further comprises an optical switching medium actuator to move the optical switching medium rotatably about a rotation axis.

21. The system of claim 17, wherein the system further comprises an optical switching medium actuator to move the optical switching medium along at least one axis.

22. The system of claim 17, wherein each of the plurality of waveguides extends from an optical input to an optical output, wherein the optical inputs and optical outputs of only one optical switching region are aligned with the transmitting portions and receiving portions of the I/O apparatus at a time, wherein each optical switching region routes at least one optical input to a different optical output than at least one other optical switching region.

23. The system of claim 17, wherein the plurality of optical waveguides comprises:
a plurality of first optical pathways; and
a plurality of second optical pathways, each second optical pathway optically couples two of the first optical pathways, wherein the plurality of waveguides are defined using the first and second optical pathways.

24. The system of claim 23, wherein the first optical pathways extend arcuately and the second optical pathways extend radially.

25. The system of claim 23, wherein each second optical pathway optically couples two of the first optical pathways via an evanescent coupler.

26. A system comprising:
an input/output (I/O) apparatus comprising:
a plurality of optical transmitting portions, and
a plurality of optical receiving portions; and
an optical switching medium comprising a plurality of optical waveguides defining a plurality of optical switching regions, the optical switching medium movable with respect to the I/O apparatus to position the optical switching regions to align the optical transmitting portions and optical receiving portions of the I/O apparatus with the plurality of optical switching regions to receive optical signals from the optical transmitting portions and to transmit optical signals to the optical receiving portions to provide switching of optical signals between the plurality of optical transmitting portions and the plurality of optical receiving portions, wherein the plurality of optical waveguides comprises:
a plurality of first optical pathways; and
a plurality of second optical pathways, each second optical pathway optically couples two of the first optical pathways, wherein the plurality of waveguides are defined using the first and second optical pathways.

* * * * *